United States Patent [19]

Greenway et al.

[11] Patent Number: 5,592,237
[45] Date of Patent: Jan. 7, 1997

[54] HIGH RESOLUTION IMAGE PROCESSOR WITH MULTIPLE BUS ARCHITECTURE

[75] Inventors: William C. Greenway, Tully; David Breithaupt, Dewitt; Donald W. Schoppe, Bridgeport; Norman M. Lutz, Liverpool; Andrew W. Beardslee, Baldwinsville; Minh N. Nguyen, Liverpool; Timothy L. Stevener, Cicero, all of N.Y.

[73] Assignee: InfiMed, Inc., Liverpool, N.Y.

[21] Appl. No.: 334,577

[22] Filed: Nov. 4, 1994

[51] Int. Cl.$^6$ .............................. H04N 5/907; H04N 7/00
[52] U.S. Cl. .................... 348/716; 348/718; 348/231; 348/552; 348/426; 345/200; 395/309
[58] Field of Search ...................... 348/715, 716, 348/718, 719, 162, 231, 426, 555, 572, 552, 913; 345/189, 190, 200, 201; 395/309, 311, 312, 497.02, 164, 166; 358/909.1; H04N 5/907, 7/00

[56] References Cited

U.S. PATENT DOCUMENTS

| | | | |
|---|---|---|---|
| 4,868,651 | 9/1989 | Chou et al. | 358/111 |
| 5,179,582 | 1/1993 | Keller et al. | 378/96 |
| 5,220,312 | 6/1993 | Lumelsky et al. | 345/200 |
| 5,452,022 | 9/1995 | Yamamoto et al. | 348/231 |
| 5,481,279 | 1/1996 | Honda et al. | 345/201 |
| 5,483,296 | 1/1996 | Nonweiler | 348/715 |

*Primary Examiner*—John K. Peng
*Assistant Examiner*—Jeffrey S. Murrell
*Attorney, Agent, or Firm*—Trapani & Molldrem

[57] ABSTRACT

A multiple video data bus architecture permits high speed data transfer among the various circuit elements of a fluoroscopic imaging processor. This permits simultaneous acquisition, display, and image enhancement of high resolution, i.e., 2K×2K images. A memory interface circuit compresses the video data for storage in bulk memory. The processor supports several high-resolution monitors which can respectively display radiographic images from different subjects, so that review and diagnosis can occur remotely.

9 Claims, 7 Drawing Sheets

HIGH RESOLUTION IMAGE PROCESSOR WITH MULTIPLE BUS ARCHITECTURE

BACKGROUND OF THE INVENTION

This invention relates to techniques for processing video images, and is more particularly concerned with techniques for capturing, storing, enhancing and displaying high resolution video images, especially fluoroscopic or other radiographic images.

The field of digital video radiography has recently received increased attention as a clinical diagnostic procedure, particularly for its advantages over traditional silver-halide film techniques. New radiographic techniques such as digital subtractive angiography (DSA) and digital computerized fluoroscopy have found increasing utility among many health care practitioners because of the capability of producing enhanced images in which diseased or injured tissues can be strongly highlighted.

One example of a computerized digital video fluoroscopic imaging arrangement is set forth in U.S. Pat. No. 4,868,651, granted Sep. 19, 1989, to T.J. Chou et al. In that arrangement the images were industry standard 256 line flames, and produced a matrix or tableau of 256×256 pixels.

Recently, because of a desire for increased resolution and detail, the introduction of high resolution video imaging technology now makes it possible to produce radiographic images of extreme resolution, with a line density of 2048 lines per frame, and 2048 by 2048 (or 2K by 2K) pixels per frame.

However, to date it has not been possible for an imaging computer to acquire, store and display a series of high resolution (2K by 2K) images except at an unacceptably low frame rate. Some technological obstacles had earlier precluded high resolution 2K by 2K imaging, but recent advances, particularly in semiconductors and new camera developments, have made high resolution imaging more promising. However, because of the very high density of the images, and the amount of data to be processed and transferred from place to place in the image processing equipment, multiple image acquisition and processing has not been achieved for high resolution images.

Recent advances in semiconductors include the introduction of various CMOS components capable of 40 MHz operation, or faster, such as 10-bit 40-megasample A/D converters and 40 MHz processors. Four-megapixel frame storage is now achievable on a 4 megabit dual-ported video random access memory (VRAM).

Recently a high resolution camera has been introduced, with 2000 line resolution and high signal-to-noise ratio. This new camera employing a Plumbicon XQ5002 imager tube can reproduce an image with four times the number of resolvable elements achieved previously, and when used with an associated low noise amplifier the camera produces its video output signal with a signal to noise ratio of 60 dB.

The camera itself is capable of operating at several combinations of scanning speeds, namely vertical scan rates of 60, 30, 15 or 7.5 Hz, while the horizontal or line rate can be either 31.5 KHz or 15.75 KHz. Additional modes can be established for European standard (e.g. 50 Hz vertical scan rate. ) This provides sixteen modes which can be implemented automatically with various programmable logic devices.

Current designs for radiographic imaging computers have only a limited ability to acquire, enhance, and reproduce high resolution images. Even at the maximum clock rates possible, image data can only be transferred at a rate of a few frames per minute, and the equipment has been unable to acquire and store one set of high resolutions images (for example from a fluoroscope in an examining room) while reproducing a second set of high resolution images (for example on a screen in a radiologist's office).

OBJECTS AND SUMMARY OF THE INVENTION

Accordingly, it is an object of this invention to provide an image processor, storage, enhancement and display device which is capable of acquiring and processing multiple sets of very high resolution digital video images.

It is a more specific object to acquire and process high resolution imager at a rate of up to 7.5 fps for 2K×2K images.

It is a key object to acquire high resolution images from one subject while processing or displaying high resolution images from another subject.

According to an aspect of this invention, a high-resolution image storage and processing arrangement is capable of acquiring 2K by 2K images, and is at the same time capable of storing, enhancing, and displaying various series of high resolution images. In the preferred embodiment these images are radiological (i.e. fluoroscopic) images, but in the most general terms the images can be acquired from any source where high resolution is desired, and where the imager delivers image signals with a line density of 2000 lines per frame.

An A/D converter circuit is responsible for converting the video image signals to a digital image signal as a sequence of digital bytes at a density of 2K bytes per line of the video image.

A memory interface circuit accepts flames of the digital image signal and conditions the same for writing it onto a bulk storage medium, e.g., magnetic disk memory. The memory interface circuit also reads out frames of the digital image signal from the bulk memory, and these two operations can occur simultaneously. The memory interface circuit includes data compression circuitry, such as standard JPEG compression buffering, for greater storage capacity and rapid reading from and writing to bulk memory.

An image processor circuit includes video memory means for storing first and second frames of the digital image signal, e.g. to use as a mask image and a subtractive image, for image enhancement. This processor also includes circuitry for image enhancement such as is described in U.S. Pat. No. 4,868,651-mentioned earlier, and non-linear image enhancement transform circuitry which can enhance the contrast and show up faint details in the video image. A crossbar switch provides data connection between a data bus interface and the various image enhancement and memory means on this circuit board.

A display interface circuit is responsible for providing the video image signal to an associated image display device (i.e. a monitor or a hard copy printer), including on-board memory for temporarily storing at least one frame of the input digital image signal, and buffering means that provides the video image signal to the display device at a frame rate that is not dependent on the frame rate of the digital image signal being supplied to the display interface circuit. In practice, the arrangement includes several display interface circuits, so various images can be displayed at the same time on different monitors or displays.

A system controller circuit can be configured in the form of a CPU card, and a user interface circuit couples to a user interface, such as a control pad or touch panel screen, and can also support a digital hard copy interface for producing high resolution (2K by 2K) image hardcopy.

These circuits can be implemented on boards which plug into a back plane that contains a digital control bus and multiple parallel data buses, each of which is independently addressable. The multiple data bus architecture permits the high speed simultaneous transfer of various different frames of the digital image signal between the other components boards. In a preferred embodiment there are five (5) parallel independently addressable data buses, and each of the A–D circuit board(s), the display interface circuit board, the image pipeline processor board, and the memory interface board has a five fold data bus interface circuit connecting to respective nodes of each of the five data buses. These boards also couple to the control bus as do the system controller circuit board and the user interface board. Additional data buses can be implemented in the back plane.

In the preferred embodiment the data buses are BTL (backplane transceiver logic).

The above and many other objects, features, and advantages of this invention will become apparent from the ensuing description of a preferred embodiment, to be read in conjunction with the accompanying Drawing.

DETAILED DESCRIPTION OF THE PREFERRED EMBODIMENT

Figure 1:
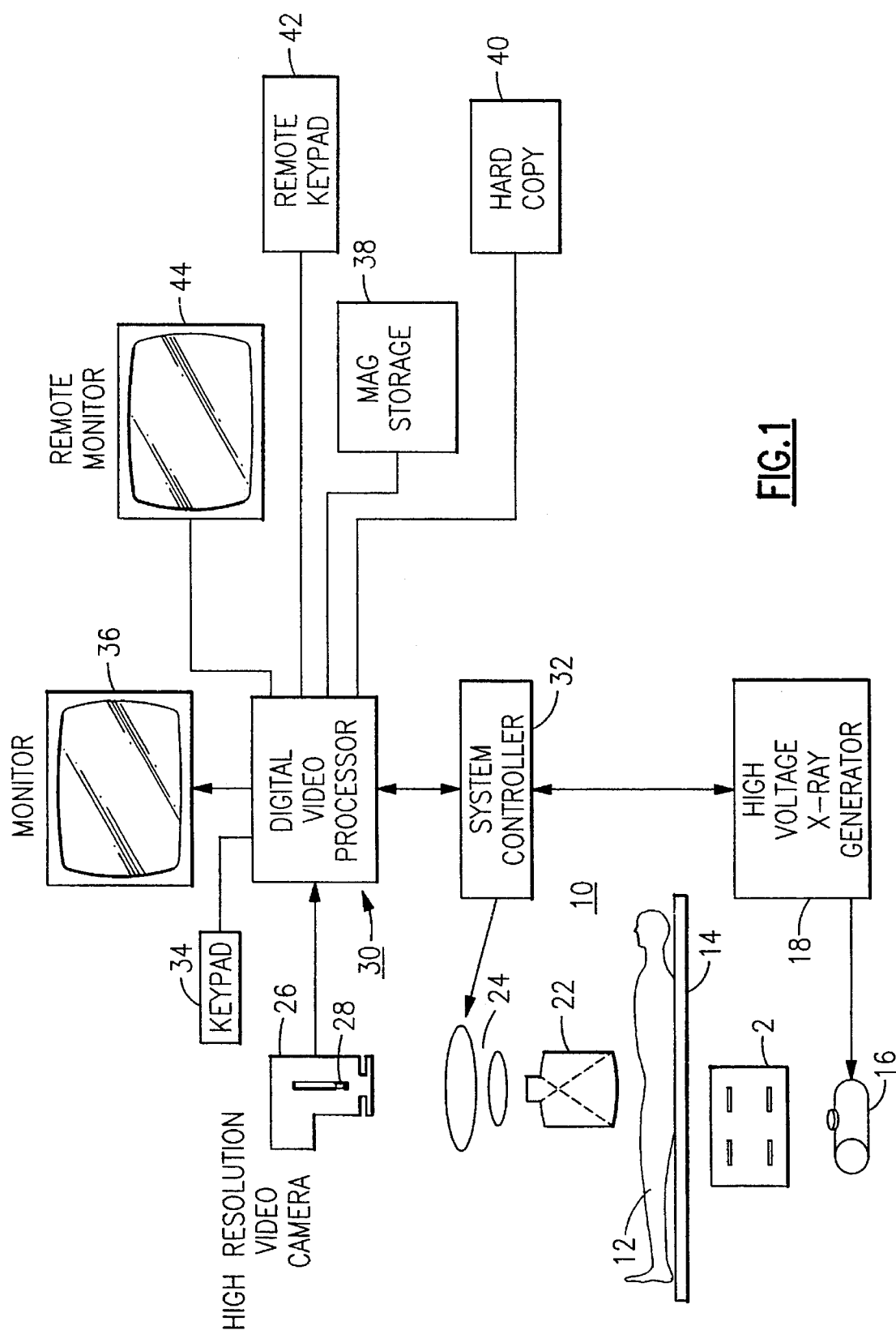
FIG. 1 is a schematic view of a high resolution computerized digital video fluoroscopic imaging arrangement which incorporates the features of this invention.

With reference to FIG. 1 of the Drawing, a video imaging digital fluoroscope arrangement 10 is shown with a human patient 12 lying horizontally on a stage or table 14. An X-ray tube 16 beneath the table receives high voltage impulses from an X-ray generator 18, and emits radiation which passes through a collimator 20 and then through the body tissues of the patient 12, to fall on an image intensifier 22. The latter produces a fluorescent image that passes through focusing and aperture optics 24 and is picked up by a video camera 26. In this case, the camera contains a high-resolution camera tube 28. This camera produces a video signal which is then fed to a fluoroscopic image processor, i.e. a digital video processor 30. The processor is coupled to a system controller 32 which provides control signals for aperture control of the optics 24 and also for level and timing of the high voltage from the generator 18. A number of external devices are connected to the processor 30, and these include a control room key pad 34 and control room monitor 36, the monitor 36 having a high-resolution screen. A storage device, e.g., a magnetic disk unit 38, serves as a bulk storage facility for the high-resolution digital images processed in the processor 30. The processor is also coupled to a hard copy machine 40, which produces radiographic images on paper or if preferred on film. A remote key pad 42 and a remote monitor 44 also coupled to the digital video processor 30 can be located in a second room to permit viewing of images e.g. images reproduced from those stored on the magnetic storage facility 38. In order to obtain the highest possible resolution, the camera tube 28 achieves resolution, in this case, of approximately 2048×2048 pixels.

The vidicon tubes which have been commonly used for fluoroscopy were originally developed to meet broadcast television and signal distribution requirements. Although great progress has been made in quality of these tubes and despite advances in camera technology, there still remain fundamental limitations to the technology as applied to fluoroscopic imaging. One main limitation has been that the resolution limit of 525 lines is overly restrictive. For that reason, in this invention an xQ5002 Plumbicon tube is employed. This can,achieve the required 2K line resolution, and can produce a digital resolution of 2048×2048 pixels. This technology employs static deflection to accomplish extreme, precise image linearity.

Alternative means for producing images of approximately 2048×2048 pixels may be employed. Such cameras employ solid-state imaging sensors such as CCD's, CID's or photodiode arrays.

The camera 26 is adapted to be operated in several combinations of scanning speeds. For NTSC standards, the vertical scan rate may be selected at any of four rates namely 60, 30, 15 or 7.5 Hz, while the horizontal rate may be any of two rates, namely 31.5 or 15.7 HHz. Eight additional modes are also available according to PAL and SECAM. Thus, there are sixteen different modes preprogrammed for use in the processor 30.

Figure 2:
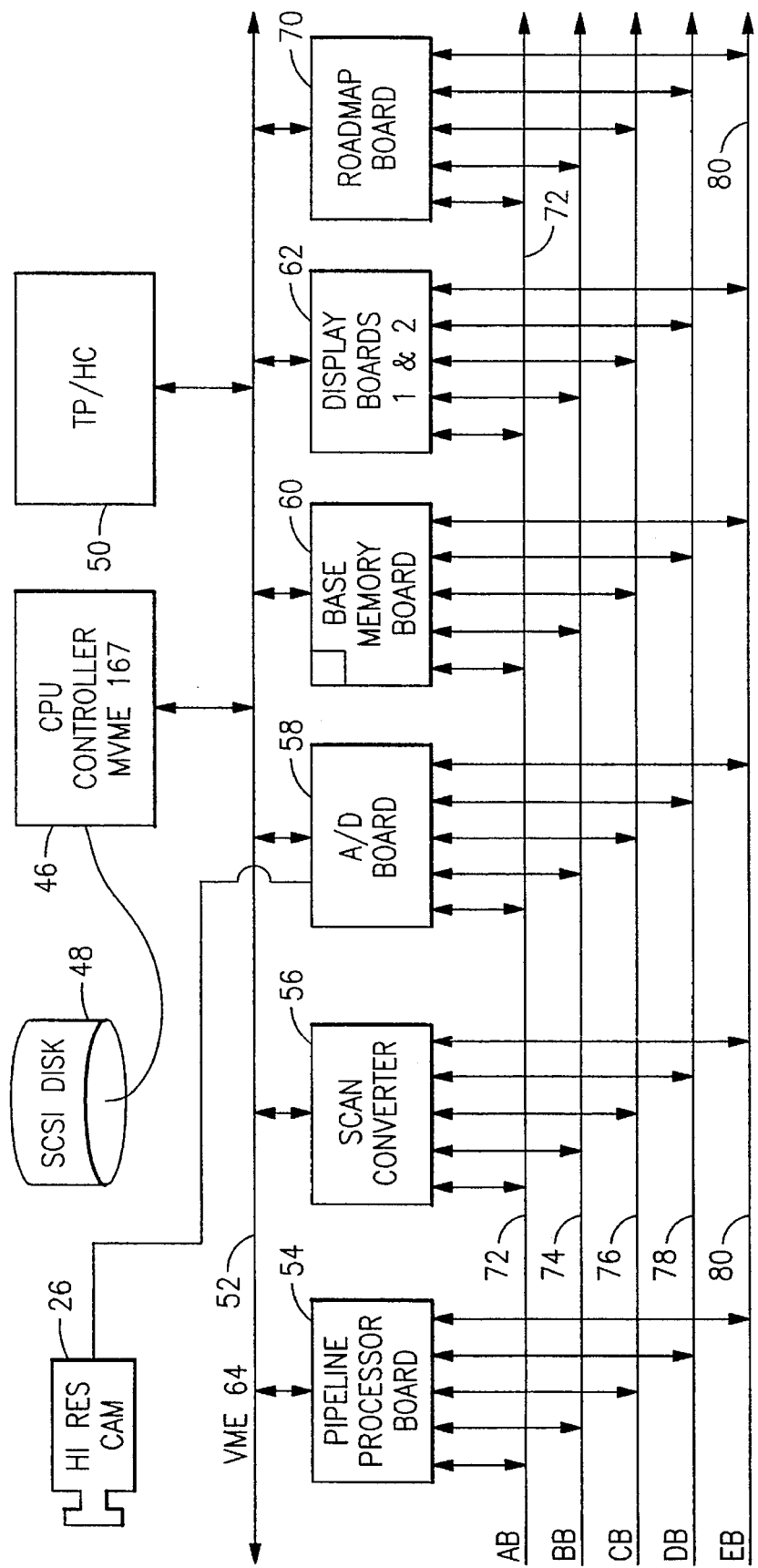
FIG. 2 is a block diagram of one embodiment, showing data flow connectivity.
Figure 3:
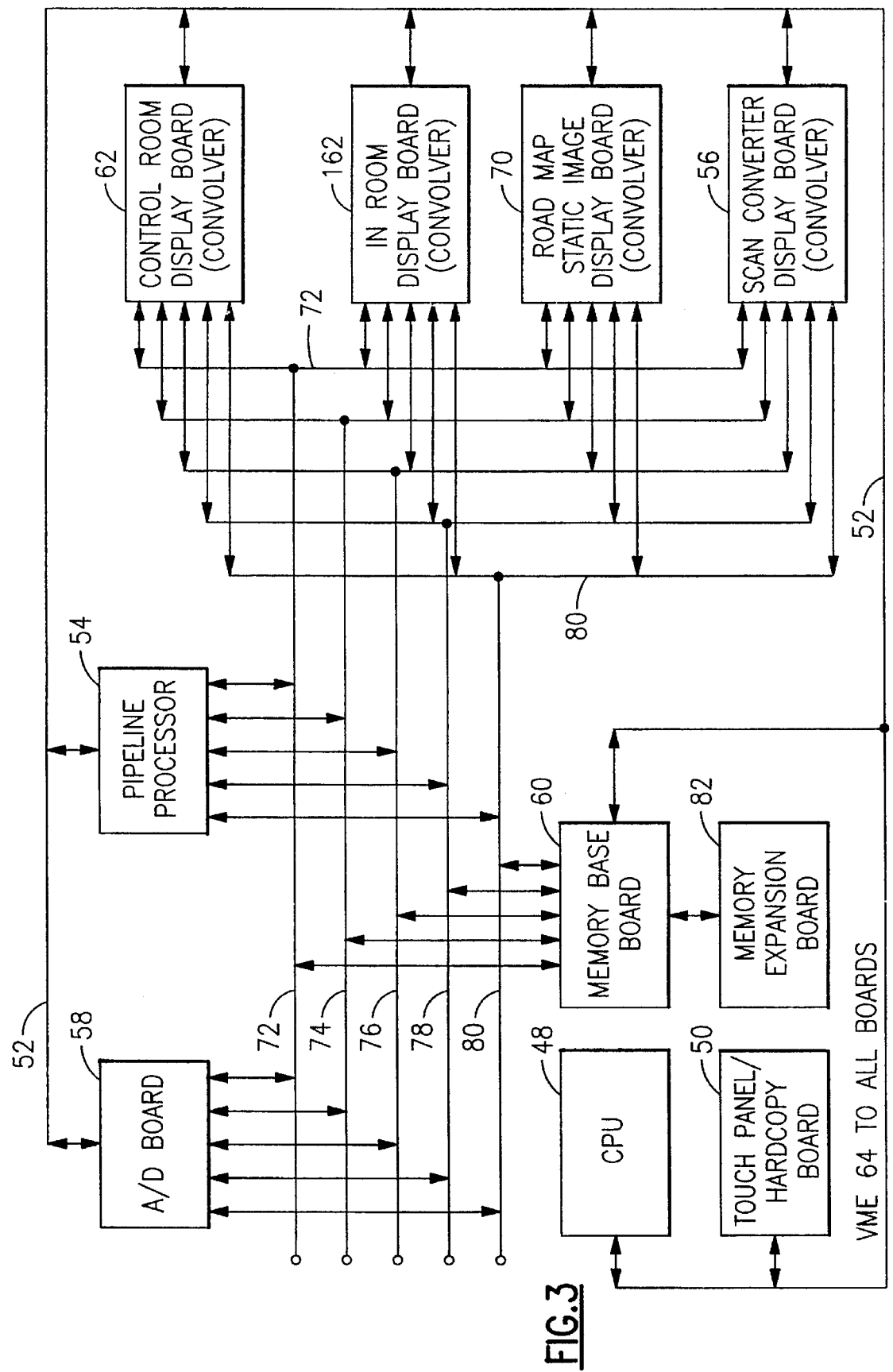
FIG. 3 is a system architecture block diagram of this embodiment.

In order to handle the large volume of digital data associated with each image, i.e., 4 megabytes per image, at an acceptable rate of data transfer, the digital video processor 30 has a multiple data bus architecture. In this architecture there are five imaging buses employed to interconnect circuit board resources. The data flow connectivity shown in FIGS. 2 and 3 provides a flexible interconnect network which makes it possible to perform multiple image processing operations simultaneously. For example, with the processor 30 it is possible to display real time images as they are being acquired, while at the same time an image processor performs image subtraction or image data manipulations from other stored images, and displays them on a separate monitor.

As shown in FIG. 2, a CPU controller board 46 which generates commands to control other elements of the processor is coupled to a system disk drive 48 and is also coupled to a touch pad device 50 by means of a VME data bus 52, here having a width of 64 bits. An image processor board 54, which contains circuitry for processing and enhancing the digitized video signals, a scan converter board 56, an A/D converter board 58, a base memory board 60, one or more display interface boards 62, and a road map board 70 all have control inputs coupled to the VME control bus 52. Also shown schematically in FIGS. 2 and 3 are five parallel, independent data buses 72, 74, 76, 78 and 80. Each of these data buses has respective nodes coupled to each of the foregoing elements, namely the image processor board 54, the scan converter board 56, the A–D circuit board 58, the base memory interface board 60, each of the display boards 62, and the road map board 70. These data buses are preferably back plane transceiver logic (BTL) and together form the multiple bus architecture which forms the basis of the improved, high-speed and high-data-density operation of the processor 30. The high resolution camera 26 is coupled to an input of the A–D interface board 58. The memory interface board 60 couples to bulk memory (not shown) such as magnetic disk storage.

As shown in FIG. 2, in this architecture, four multiple display interface boards are provided, including a control room display board 62 (with convolver) an in-room display board 162, the road map board 70 which is a static image display interface board, and the scan converter display board 56. A memory interface base board 60 has an associated memory expansion board 82. The various boards including the memory based board 60, the A–D interface board 58, the image processor board 54, and the display board 62, 162, 84 and 56 in all exchange image data by means of the multiple BTL buses 72, 74, 76, 78, and 80. Data transfer can occur in both directions simultaneously, via selection of separate buses, so that image acquisition, image display, writing to memory, reading from memory, and image processing can all occur at a suitable high rate of speed without interfering with one another.

Figure 4:
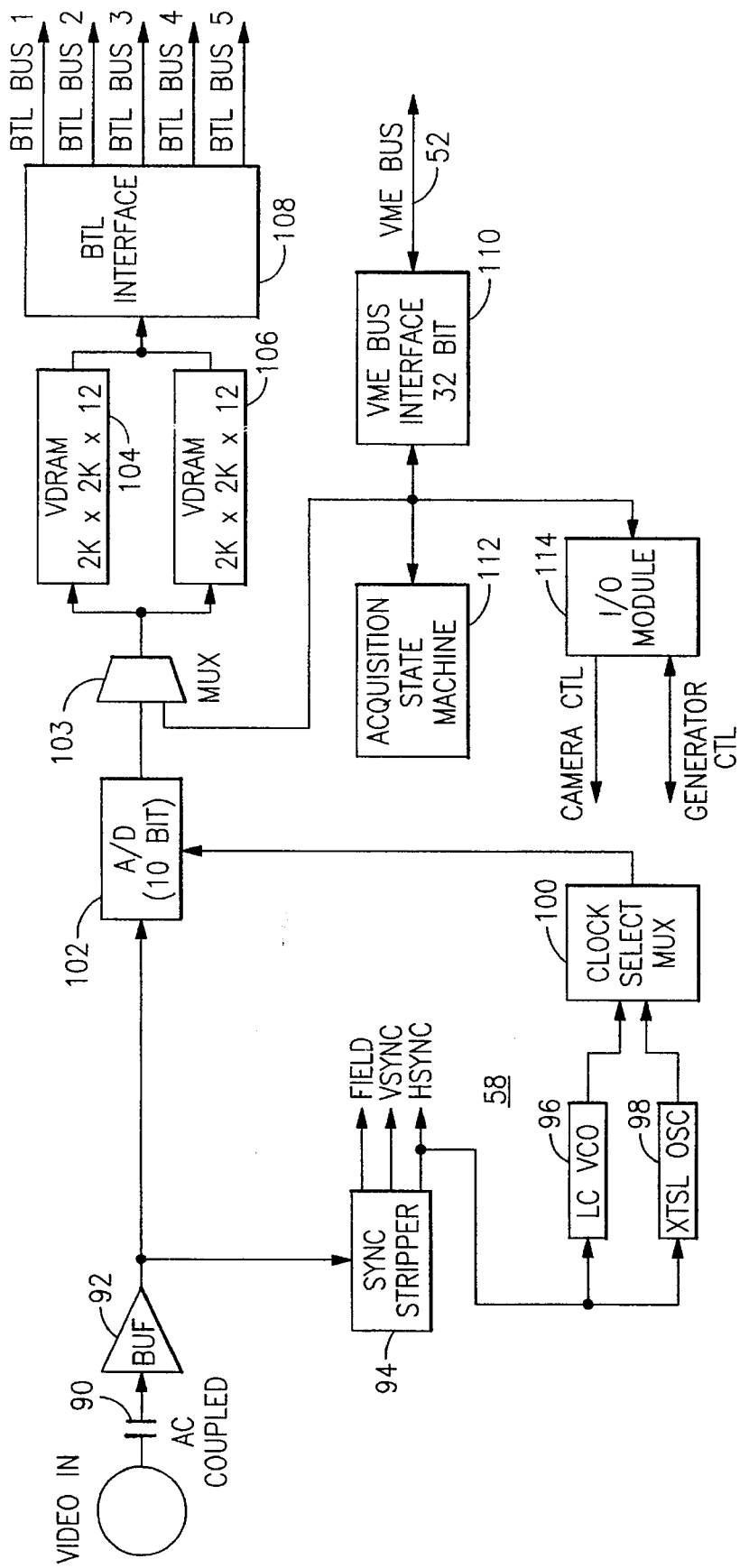
FIG. 4 is a schematic block diagram of the A–D circuit element.

A block diagram of the A–D interface board 58 is shown in FIG. 4. Here, a capacitor 90 provides AC coupling of the analog video input, through a buffer 92. Field, vertical, and horizontal synchronizing signals are stripped in a sync stripper module 94. The horizontal synchronizing signals are fed to a voltage controlled oscillator 96 and also to a crystal oscillator 98, both of which have outputs applied to a clock-select multiplexer 100. A clock signal and the video input signal are each fed to a 10 bit A–D converter 102, whose output is supplied as a digital image signal which is fed through a multiplexer 103 to a video memory that is comprised of a first video dynamic RAM 104 and a second video dynamic RAM 106 connected in parallel. Each of the VDRAMs 104 and 106 stores one complete 2K×2K frame of the video signal, and as a digitized video signal. The video output signal is applied, from each VDRAM 104, 106 alternately to a backplane transceiver logic interface 108, which sends the digitized video signal to a selected one of the BTL buses, 72, 74, 76, 78, 80.

The VME bus interface 110 provides coupling to the VME control bus 52, and couples through an internal bus to the multiplexer 103, an acquisition states machine 112 and an I/O module 114.

The acquisition state machine 112 controls the acquisition pixel order and the horizontal and vertical line orders i.e., controls the transfer of images into the system.

Figure 6:
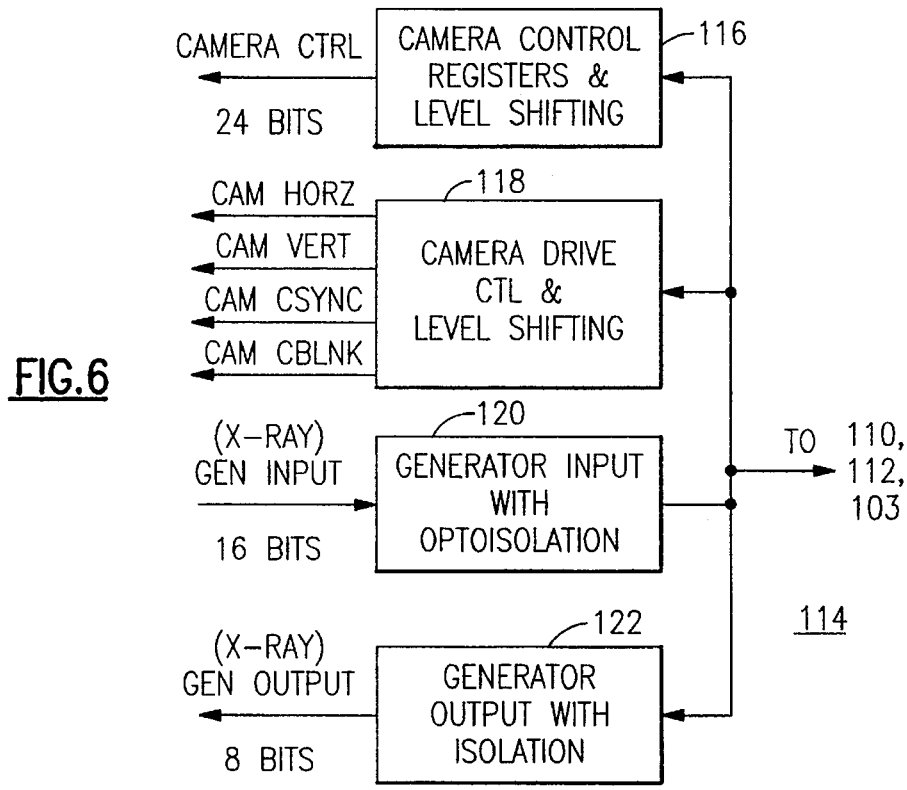
FIG. 6 is a block diagram of an I/O module incorporated into the A–D circuit of FIG. 4.

The I/O module 114 provides control signals to the camera 26 and also to the high voltage x-ray generator 18. The I/O module 114 is shown in more detail in FIG. 6. The block 116 represents camera control registers and level sensing circuitry which provides a camera control signal for regulating brightness and contrast in the camera 26. The circuitry 116 also controls the camera mode. Camera drive control and level shifting circuitry 118 provides control and synchronizing signals including the camera horizontal signal and the camera vertical signal, the camera horizontal sync signal, and a composite blanking signal. The circuit 116 also controls the camera mode.

The generator input circuit 120 and the generator output circuit 122, respectively, are coupled through internal opto isolators to the X-ray generator 18, for providing generator control signals and receiving generator feedback signals.

Figure 5:
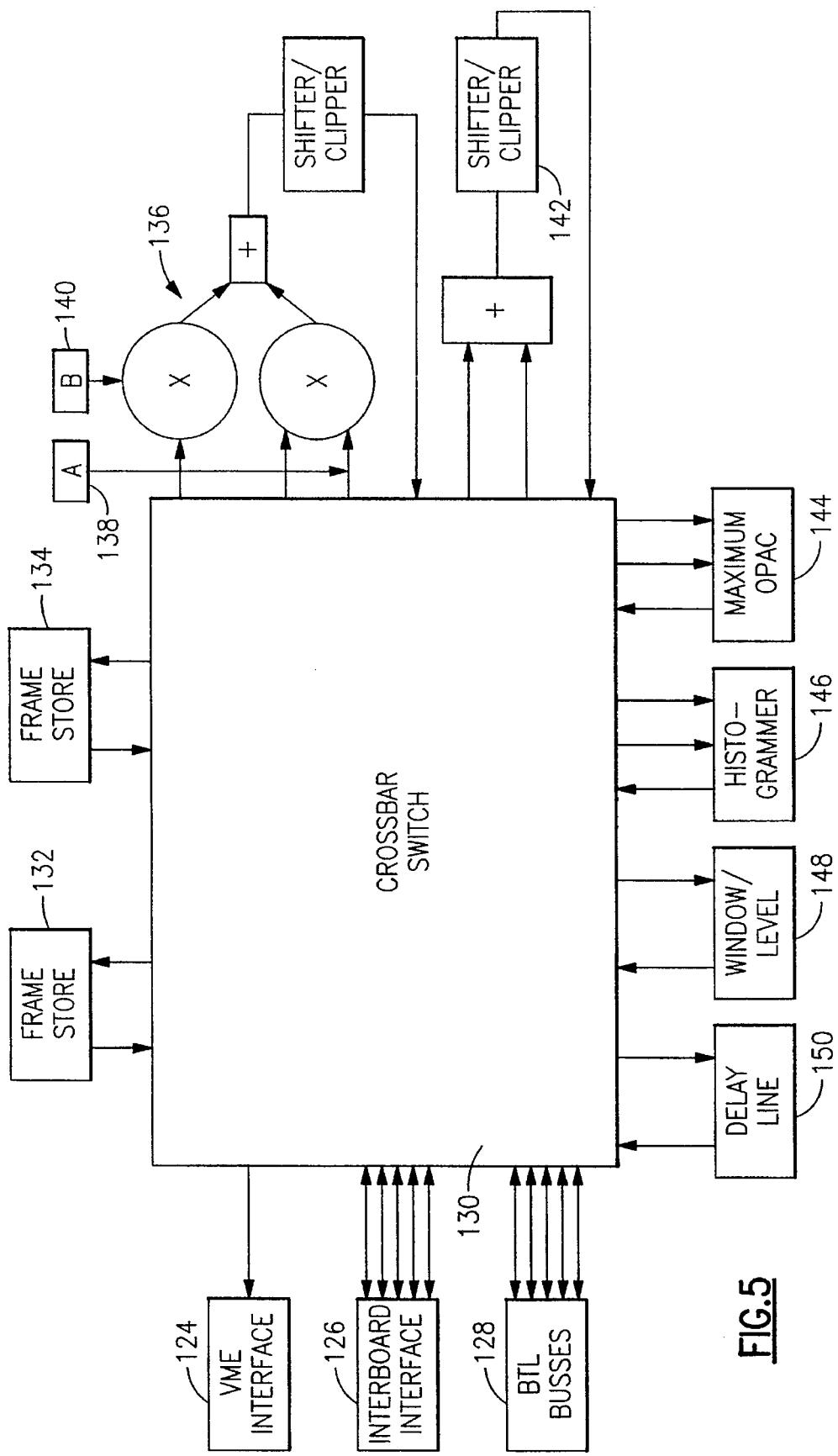
FIG. 5 is a schematic block diagram of the image processor of this embodiment.

The details of the image processor board 54 are shown in FIG. 5. Here a VME control bus interface 124 couples to the control bus 52, an interboard interface 126 achieves direct coupling between the image processor board and other of the main boards shown in FIGS. 2 and 3, and a BTL interface 128 provides five-fold coupling to the BTL data buses 72, 74, 76, 78, and 80.

A crossbar switch 130 controllably couples to one another the various sub-elements shown in FIG. 5. A first frame memory store 132 and a second frame memory store 134 are each coupled to the cross bar switch, and each have a four megabyte capacity for storing the digital information representing a single 2K×2K image. Shown on the fight side of the crossbar switch 130 is an integration circuit 136 that accomplishes noise filtering across a series of images. The integration circuit 136 has an associated pair of frame memories 138 and 140.

Figure 7:
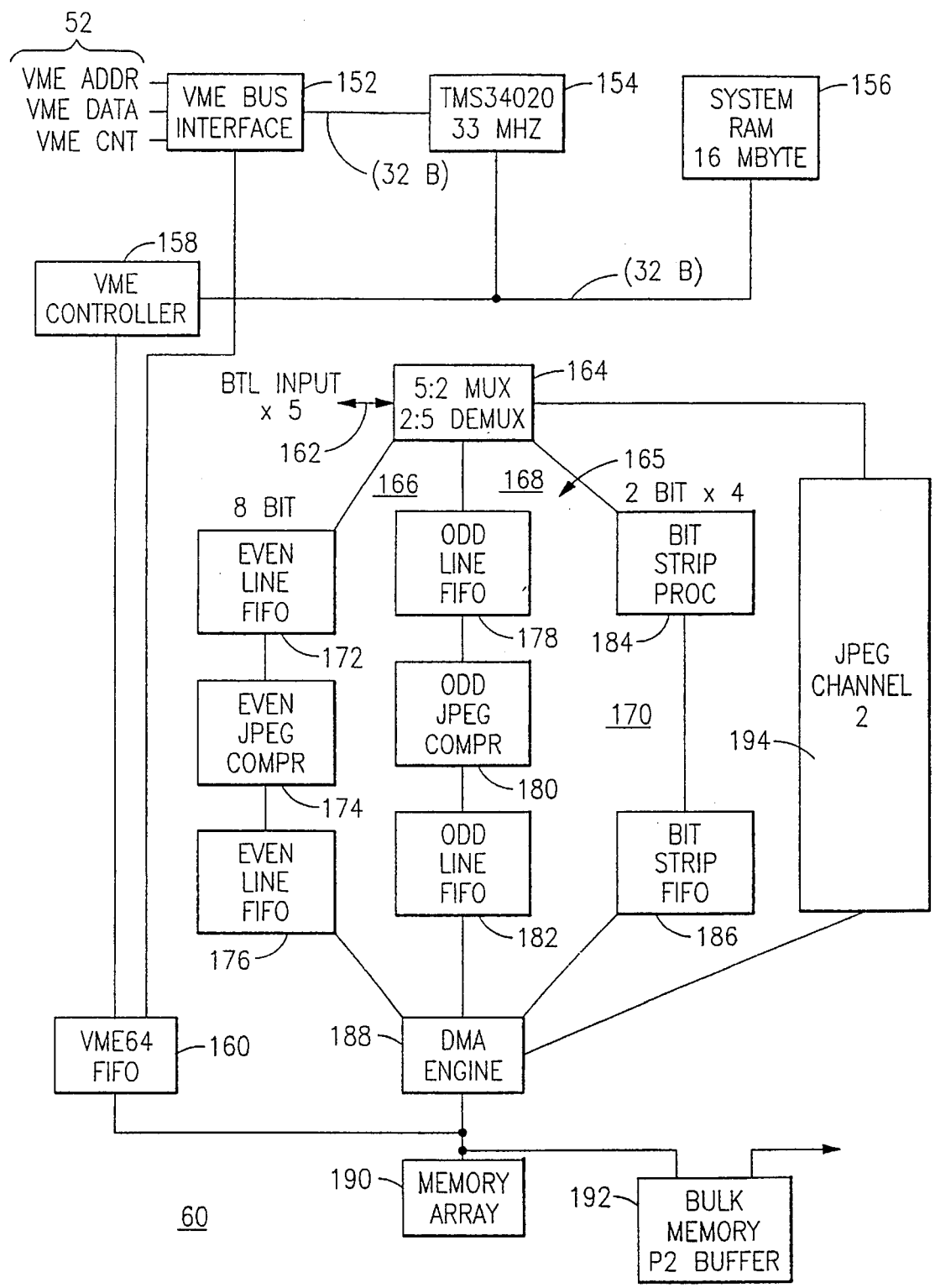
FIG. 7 is a schematic block diagram of the memory interface circuit of this embodiment.

A subtraction circuit 142 accomplishes masking and subtraction of images, for example to perform digital subtractive angiography, or DSA. A maximum opacity circuit 144 finds the highest and lowest values for each pixel over a series of images. A histogrammer 146 carries a histogram function to develop histogram distribution of pixel values. This can be employed for non-linear image enhancement transformation, for example as described in Chou et al. U.S. Pat. No. 4,868,651. A window/level circuit 148 provides optimization and adjustment of brightness and contrast. A delay line 150 can impose a selected time delay, for example a delay of one line or a delay of one frame. As aforementioned, the image processor 54 can carry out any of a variety of image enhancement operations, either for an image that is being acquired, or for an image that has been stored. The multiple data bus architecture permits the pipeline processor 54 to communicate with the circuit boards, and to send to and receive image data simultaneously from any of the other boards. The pipeline processor can carry out a number of image enhancement operation simultaneously. The memory interface board 60 is shown in greater detail in FIG. 7. Here, a VME bus interface 152, coupled to the VME control bus 52, receives VME address, data, and control signals. A controller 158 conducts the compression, recording, decompression, and playback functions carried out on this interface board. These are coupled to the VME memory register 160, operated on a first-in-first-out (FIFO) basis. The memory register is coupled back to the VME interface 152 is and is also coupled forward of the compression channels.

A BTL interface 162 is coupled to the BTL data buses, 72, 74, 76, 78, 80 and is also coupled to a mux/demux 154, which functions both as a 5:2 multiplexer and a 2:5 demultiplexer.

A first compression channel 165 has inputs coupled respectively to the multiplexer/demultiplexer 164 and comprises an odd line channel 166, a even line channel 168, and a bit strip channel 170. In a preferred embodiment, digital image data is provided as 10-bit bytes. The eight most significant bits of the even line bytes are supplied to the even line channel, and the eight most significant bits from the odd-line bytes are supplied to the odd-line channel 168. The two least significant bits, from two odd line bytes and two even-line bytes, are combined into eight-bit bytes. These go to the bit strip channel 170.

Even-line channel 166 has an even-line register 172 and an even-line compression circuit 174 operated on a JPEG protocol, and then another even-line register 176. The registers 172 and 176 are operated on a first in first out (FIFO) basis. The odd-line channel similarly has a FIFO odd-line register 178, a JPEG odd-line compressor circuit 180, and a FIFO odd-line register 182. The bit strip channel 170 includes a bit strip processor 184 that is directly coupled to a bit strip FIFO register 186, The three sub-channel 166, 168, 170 feed into a DMA engine 188, which sequences the successive bytes and forwards them to a memory array 190 for intermediate storage. The compressed image data are then forwarded via a bulk memory buffer 192 to a suitable bulk storage device, such as a magnetic disk (not shown). In operation, the compression channel 165 serves as to compress the four Mbytes of each frame of image information into approximately 2 Mbytes for storage on the disk. This reduces the disk storage required to half of what is needed for uncompressed data. This also reduces the time required for a read or write operation, because only 2 Mbytes per frame are involved in the compressed data.

A second compression channel 194 is also schematically shown coupled between the multiplexer/demultiplexer 164 and the DMA engine 188. The availability of these two channels 165, 194 means that one series of images can be retrieved from the bulk memory while another series of images is being stored on the memory. Images can be acquired and stored while other images are being retrieved, processed, and displayed without the storage and retrieval operations interfering with one another.

Figure 8:
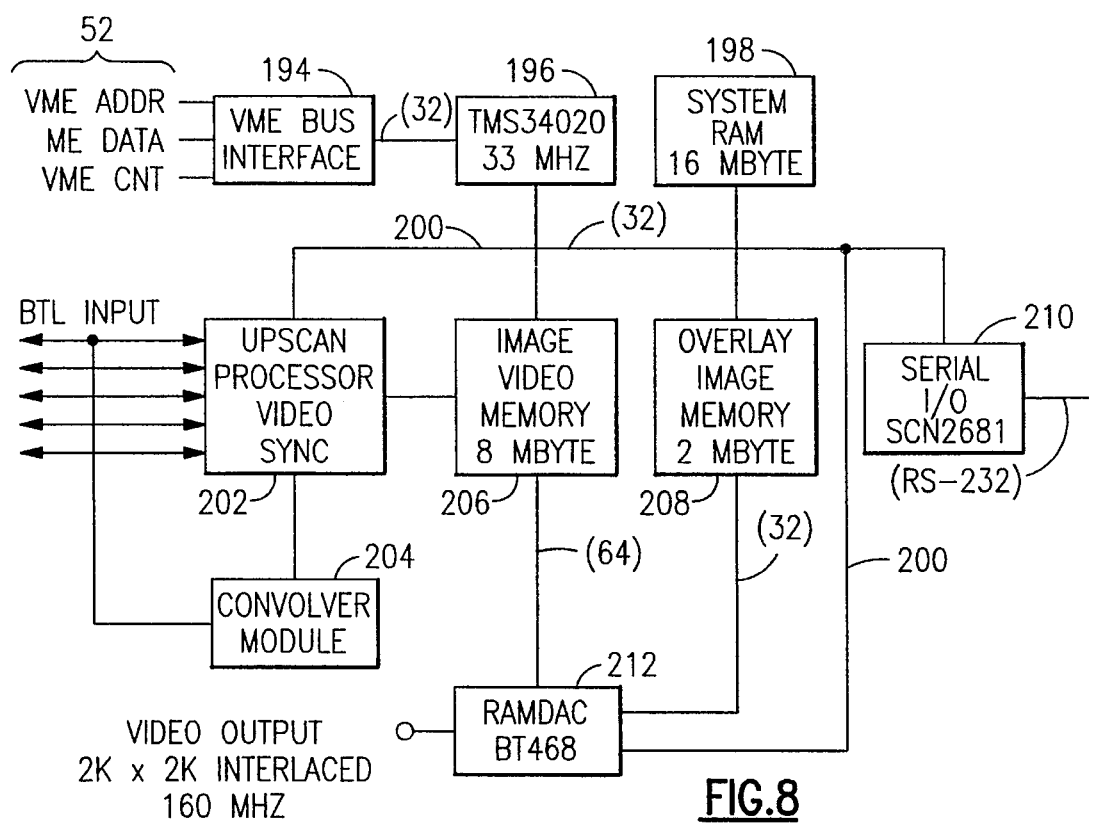
FIG. 8 is a schematic block diagram of the display interface circuit of this embodiment.

A typical display interface board 62 is shown in FIG. 8. Here a VME bus interface circuit 194, which is coupled to the VME bus 52, is connected by an internal bus to a 34020 processor 196, which serves to generate graphics and text, and provides an overlay image. The processor 196 has an associated system RAM 198, and these are coupled via an internal control bus 200 to an upscan processor 202. This processor is coupled to the BTL data buses 72, 74, 76, 78, 80. These data buses connect to any other boards to obtain digital video data associated with a particular image. The processor 202 has an associated convolver module 204 that carries out an edge enhancement function. The convolver module 204 can be constructed according to known technology. The processor 202 provides video and sync information to an image video memory 206. The memory 206 has an eight megabyte capacity, and in this embodiment is capable of storing two complete frames of video data. An overlay image memory 208, here of two megabyte capacity, stores an overlay image containing text, graphics, and other information to be layered onto the stored image in the image memory 206. A serial I/O interface 210 permits an external device to be coupled to the interface port 62 for circuit diagnostic purposes.

The control bus 200 and the image and overlay memories 206, 108 are connected to inputs of a video output device or RAMDAC 212. This output device 212 converts the digital images into a high resolution (2048 line) output video signal, which can be supplied to a high resolution video signal, which can be supplied to a high resolution monitor at refresh rates high enough to eliminate flicker.

With the image processor 30 according to this invention, high resolution images can be acquired and displayed in real time, and a sequence of images can be acquired or retrieved from memory at a high image rate. That is, 2K×2K interlaced images can be displayed at a minimum of 7.5 IPS. The five-image-bus architecture described in respect to this embodiment can acquire and store one set of images while displaying and processing two other sets of images. This architecture can be expanded to more than five data buses to achieve even greater parallel capacity. In addition, the five data bus architecture can handle images at various modes simultaneously, so that the processor 30 can acquire and process 2K images, 1K images, and images of a lower resolution, at two speeds simultaneously. The five-image-bus architecture permits true multi-tasking operation, and can be used for simultaneous single room acquire and review of images; simultaneous single room bi-plane image acquiring; and simultaneous two-room acquire and print operations. An acquisition rate of 4 frames per second or higher can be achieved with 2K by 2K 10-bit images.

While not specifically shown in detail, the touch panel/hard copy interface board has the facility to support four independent touch panel input modules for interfacing with users. The touch panel/hard copy port can supply standard black/white VGA data to a touch panel (i.e. touch screen) input module for display of system control menus. Communication between the circuit board 50 and the touch panel electronics can be over a standard RS232 serial channel.

While this invention has been described in detail with respect to a preferred embodiment, it should be understood that the invention is not limited to that specific embodiment. Rather, many modifications and variations will present themselves to persons skilled in the art without departing from the scope and spirit of this invention, as defined in the appended claims.

What is claimed is:

1. High resolution digital image storage and processing arrangement for capturing, storing, enhancing and displaying a series of video images produced by a high resolution video imager that delivers image signals having a density of 2048 lines per frame and for furnishing said video image signals to a high resolution image display device, comprising:

a) A/D circuit means for converting said video image signals to a digital image signal as a sequence of digital bytes at a density of 2048 pixels per line of said video image signal;

b) display circuit means for providing said video image signal to said image display device including onboard memory means for temporarily storing at least one frame of said digital image signal, and buffering means for providing said video image signal to said display device at a frame rate independent of the frame rate of the digital image signal supplied to said display circuit means;

c) image processor circuit means including video memory means for storing at least one frame of said digital image signal and image enhancement means for creating an enhanced video image based on the digital image signal stored in said video memory means;

d) memory interface circuit means for writing frames of said digital image signal onto a bulk data storage medium and for reading frames of the digital image signal from said storage medium;

e) system controller means for generating control signals to control flow of said digital image signal between the A/D circuit means, said display circuit means, said image processor circuit means and said memory interface circuit means;

f) a user interface device permitting a user to select an operational mode, and means generating a control signal based on the operational mode selected;

g) a digital control bus coupled to said A/D circuit means, said display circuit means, said image processor circuit means, said memory interface circuit means, said system controller means and said user interface device for carrying control signals between said system controller means and said A/D circuit means, said display circuit means, said image processor circuit means, and said memory interface circuit means; and h) a plurality of parallel independently addressable data buses each of which is coupled to a respective data bus interface on each of said A/D circuit means, said display circuit means, said image processor circuit means, and said memory interface circuit means.

2. High resolution digital image storage and processing arrangement according to claim 1, wherein said plurality of data buses includes five BTL data buses, and each of said A/D circuit means, said display circuit means, said image processor circuit means, and said memory interface circuit means includes five BTL bus interface circuits connected to respective data ports of said BTL data buses.

3. High resolution digital image storage and processing arrangement according to claim 1 wherein said display circuit means includes an on-board video image memory, means coupling said on-board video image memory to an associated bus interface device for receiving the digital image signal from any of said plurality of data buses; a video processor coupled to said on-board video image memory and to a control bus interface that is coupled to said digital control bus; and a video output device having data input means coupled to said video image memory and control input means coupled to said video processor, and an output supplying a high-resolution output video signal to an associated display device to produce a high resolution image thereon.

4. High resolution digital image storage and processing arrangement according to claim 3, said display circuit means further including image synchronizer means for generating a vertical frame rate for said output video signal that is independent of the rate at which the digital image signal is supplied over said bus interface device to said video image memory.

5. High resolution digital image storage and processing arrangement according to claim 3, wherein said display circuit means further includes an overlay image memory coupled to said video output device and a text and graphics generator coupled to said overlay image memory for generating overlay text and graphics so that said video output device generates said output video signal with text and graphics superimposed on said high resolution image.

6. High resolution digital image storage and processing arrangement according to claim 1, wherein said image processor circuit means includes non-linear image enhancement transform means for transforming the stored digital image signals to produce an enhanced video image.

7. High resolution digital image storage and processing arrangement according to claim 6, wherein said image processor circuit means includes a control bus interface coupled to said digital control bus; data bus interface means coupled to said plurality of data buses; and crossbar switch means coupled to said control bus interface, said data bus interface means, said non-linear image enhancement transform means, and said means for storing at least two frames of said digital image signal.

8. High resolution digital image storage and processing arrangement according to claim 1, wherein said memory interface circuit means includes data compression means for converting said digital image signal to a compressed form for recording the recorded signal to a decompressed form when played back from said bulk data storage medium.

9. High resolution digital image storage and processing arrangement according to claim 8, wherein said data compression means includes first and second channels for compressing and recording a frame of said video image signal, and simultaneously playing back and decompressing another frame of said video image signal.

* * * * *